(12) United States Patent
Miedema (10) Patent No.: US 9,624,047 B2
(45) Date of Patent: *Apr. 18, 2017

(54) CONTAINER DENESTER APPARATUS

(71) Applicant: A & B Packing Equipment, Inc., Lawrence, MI (US)

(72) Inventor: Andrew Dale Miedema, Zeeland, MI (US)

(73) Assignee: A & B Packing Equipment, Inc., Lawrence, MI (US)

( * ) Notice: Subject to any disclaimer, the term of this patent is extended or adjusted under 35 U.S.C. 154(b) by 658 days.

This patent is subject to a terminal disclaimer.

(21) Appl. No.: 13/826,460

(22) Filed: Mar. 14, 2013

(65) Prior Publication Data

US 2013/0248548 A1    Sep. 26, 2013

Related U.S. Application Data (63) Continuation-in-part of application No. 13/429,931, filed on Mar. 26, 2012, now Pat. No. 8,714,406.

(51) Int. Cl.
*B65G 59/06* (2006.01)
*B65D 21/02* (2006.01)
*B65D 43/16* (2006.01)

(52) U.S. Cl.
CPC ....... *B65G 59/062* (2013.01); *B65D 21/0233* (2013.01); *B65D 43/162* (2013.01); *B65D 2543/00027* (2013.01); *B65D 2543/00203* (2013.01); *B65D 2543/00296* (2013.01); *B65D 2543/00537* (2013.01)

(58) Field of Classification Search
CPC B65G 59/062; B65D 21/0233; B65D 43/162; B65D 2543/00027; B65D 2543/00203; B65D 2543/00296; B65D 2543/00537
USPC ................................ 221/297, 222, 258, 277
See application file for complete search history.

(56) References Cited

U.S. PATENT DOCUMENTS

| | | | | |
|---|---|---|---|---|
| 1,950,382 | A * | 3/1934 | Benson | 221/297 |
| 3,601,282 | A * | 8/1971 | Vogel | 221/251 |
| 3,932,978 | A * | 1/1976 | Kinney | 53/471 |
| 4,439,101 | A * | 3/1984 | Orlowski | B65G 59/101 221/11 |
| 4,529,101 | A * | 7/1985 | Orlowski | B65G 59/101 221/11 |
| 4,702,660 | A * | 10/1987 | Niehaus et al. | 414/795.2 |
| 4,804,108 | A * | 2/1989 | Ficken | 221/223 |
| 4,809,881 | A * | 3/1989 | Becker | 221/224 |
| 5,067,308 | A * | 11/1991 | Ward | 53/471 |
| 6,913,433 | B2 * | 7/2005 | Riesterer et al. | 414/795.6 |
| 8,714,406 | B2 * | 5/2014 | Miedema | B65G 59/107 221/222 |

(Continued)

*Primary Examiner* — Michael K Collins
(74) *Attorney, Agent, or Firm* — The Watson I.P. Group, PLC; Jovan N. Jovanovic; Vladan M. Vasiljevic (57) ABSTRACT

A container denester apparatus which overcomes, among other problems, the problems identified above. The denester apparatus positively controls the flanges of the container so as to individually denest a lowermost container from a stack of containers. The apparatus protects the container by spreading the force required to denest the container along much of the flange structure. In addition, the stack of containers above the lowermost container are retained, again along much of the flange structure of the immediately adjacent container.

20 Claims, 6 Drawing Sheets

(56) References Cited

U.S. PATENT DOCUMENTS

| | | | | |
|---|---|---|---|---|
| 2013/0248546 A1* | 9/2013 | Miedema | ............ | B65G 59/107 221/1 |
| 2013/0248548 A1* | 9/2013 | Miedema | ................ | B65D 1/00 221/1 |
| 2014/0326746 A1* | 11/2014 | Miedema | ............ | B65G 59/108 221/297 |

* cited by examiner

CONTAINER DENESTER APPARATUS

CROSS-REFERENCE TO RELATED APPLICATION

The present application is a continuation-in-part of U.S. patent application Ser. No. 13/429,931 filed Mar. 26, 2012, entitled "A Container Denester Apparatus," the entire disclosure of which is hereby incorporated by reference in its entirety.

BACKGROUND OF THE DISCLOSURE

1. Field of the Disclosure

The disclosure relates in general to rigid container filling, and more particularly, to a container denester apparatus which is utilized typically upstream of a filling system. While not limited thereto, typically such an apparatus is utilized in association with clamshell containers that are often utilized in association with small fruit (i.e., blueberry, blackberry, strawberry, etc.) filling equipment. The disclosure is not limited to use in association with clamshell containers, and other containers are likewise contemplated for use, such as paperboard tray type containers (generally, that have a flange or other surface on the side which can interface with components of the apparatus).

2. Background Art

The use of containers, such as clamshell containers, is known in the art. Such containers are often utilized in association with small fruit storage, distribution and sale. In addition, such containers are likewise used in association with vegetables, prepared food and small parts and pieces.

To conserve space, these containers are typically stored and shipped in a nested configuration. To utilize the containers, a container is first denested and presented to subsequent processing. Difficulties can be encountered with the providing such nested containers sequentially to subsequent processing. Among other problems, it is often difficult to separate the nested containers and it is possible to feed multiple containers at a time. The supply of multiple containers can jam the filling equipment. In still other configurations, the denesting of the containers can fail to separate containers. At best, the subsequent processing equipment can sense this and can make adjustments. In other cases, the failure to feed a container can result in the loss of some product and possible contamination of the equipment. In either case, the efficiency of the equipment becomes compromised. Additionally, it is important to provide accurate speed and timing control so that the containers are fed to downstream equipment at the proper time and in the proper sequential order with requisite timing.

In other instances, the denesting equipment can damage a container (which tends to be rather fragile in certain directions or orientations). Among other damage, the container can be dented, thereby changing the internal Tillable dimensions and configuration. In other instances, the container can be cracked, cut or damaged to the point of loss of integrity of the container itself. If such damage is not detected, the feeding of the damaged container can result in the loss of product, damage to the equipment or contamination of the equipment.

SUMMARY OF THE DISCLOSURE

The disclosure is directed to a container denester apparatus which overcomes, among other problems, the problems identified above. The denester apparatus positively controls the flanges of the container so as to individually denest a lowermost container from a stack of clamshell containers. The apparatus protects the container by spreading the force required to denest the container along much of the flange structure. In addition, the stack of containers above the lowermost container are retained, again along much of the flange structure of the immediately adjacent container.

More particularly, the disclosure is directed to a container denester apparatus configured to denest a lowermost container from a stack of containers comprising a frame assembly, an indexing assembly and a drive assembly. The frame assembly having a front plate and a back plate defining a container cavity.

The indexing assembly comprises a first side upper slide and a second side upper slide, as well as a first side lower slide and a second side lower slide. The first side upper slide is spaced apart from the second side upper slide and each spans between the front plate and the back plate of the frame assembly. Each of the first side and second side upper slides have an inner surface with an inwardly projecting flange. The first side and second side upper slides are slidably movable between a first inward position and a second outward position. In the first inward position, the inwardly projecting flange of each of the first side and second side upper slides extend into the cavity.

The first side lower slide is spaced apart from the second side lower slide and each spans between the front plate and the back plate of the frame assembly. The lower slides correspond to and are positioned below the first side and the second side upper slides. Each of the first side and second side lower slides have an inner surface with an inwardly projecting flange. The first side and second side lower slides are slidably movable between a first inward position and a second outward position. In the first inward position, the inwardly projecting flange of each of the first side and second side upper slides extend into the cavity.

The flange of the first side upper slide is spaced apart, vertically, from the flange of the first side lower slide. The flange of the second side upper slide is spaced apart, vertically from the flange of the second side lower slide.

The drive assembly comprises an actuator coupled to the first side and second side upper slides. The actuator is configured to direct cooperative slidable movement of the upper slides between a first inward position and a second outward position. It is coupled to the first side and the second side lower slides. The actuator is configured to direct cooperative slidable movement of the lower slides between a first inward position and a second outward position.

In a preferred embodiment, the frame assembly includes a first side guide spanning between front plate and the back plate and a second side guide spanning between the front plate and the back plate. The first side guide is positioned above and over at least a portion of the first side upper slide and the first side lower slide and defines the side of the cavity, with the flange of the first side upper slide and the first side lower slide extending into the cavity. The second side guide is positioned above and over at least a portion of the second side upper slide and the second side lower slide and defines the side of the cavity, with the flange of the second side upper slide and the second side lower slide extending into the cavity.

In another preferred embodiment, the first side guide includes an inner surface which is substantially coplanar with the inner surface of each of the first side upper slide and the first side lower slide.

In another preferred embodiment, the second side guide includes an inner surface which is substantially coplanar with the inner surface of each of the second side upper slide and the second side lower slide.

In another preferred embodiment, the upper slides and the lower slides are configured to move between the first inward position and the second outward position through slidable movement. Each of the slides includes a pin at either end thereof. The pin at a first end corresponds with a slot in the front plate and at a second end corresponds with a slot in the back plate.

In one such preferred embodiment, the movement between the first inward position and the second outward position is substantially uniformly linear and substantially perpendicular to the direction of travel of clamshell containers through the denester.

In another preferred embodiment, the indexing assembly further includes a first side upper indexing rod extending above the first side upper slide. The first side upper slide further including a gear rack disposed thereon. The first side upper indexing rod has a gear positioned thereon. As a result, slidable movement of the first side upper slide between the first inward position and the second outward position imparts rotation to the first side upper indexing rod through interference between the gear and the gear rack.

In a preferred embodiment, the indexing assembly further includes a second side upper indexing rod extending above the second side upper slide. The second side upper slide further includes a gear rack disposed thereon. The second side upper indexing rod has a gear positioned thereon. As a result, slidable movement of the second side upper slide between the first inward position and the second outward position imparts rotation to the second side upper indexing rod through interference between the gear and the gear rack.

In another preferred embodiment, the indexing assembly further includes a first side lower indexing rod extending below the first side lower slide. The first side lower slide further includes a gear rack disposed thereon. The first side lower indexing rod has a gear positioned thereon. As a result, slidable movement of the first side lower slide between the first inward position and the second outward position imparts rotation to the first side lower indexing rod through interference between the gear and the gear rack.

In another preferred embodiment, the indexing assembly further includes a second side lower indexing rod extending below the second side lower slide. The second side lower slide further includes a gear rack disposed thereon. The second side lower indexing rod has a gear positioned thereon. As a result, slidable movement of the second side lower slide between the first inward position and the second outward position imparts rotation to the second side lower indexing rod through interference between the gear and the gear rack.

In a preferred embodiment, the drive assembly comprises a front actuator coupled to the upper slides and a back actuator coupled to the lower slides.

In another preferred embodiment, the front actuator is positioned proximate the front plate and the back actuator is positioned proximate the back plate.

In yet another preferred embodiment, the front actuator is configured to move in a substantially vertical direction. A first side front side linkage is pivotably coupled to the front actuator at a first end and pivotably coupled to the first side upper slide at a second end. A second side front slide linkage is pivotably coupled to the front actuator at a first end and pivotably coupled to the second side upper slide at a second end.

In another preferred embodiment, the back actuator is configured to move in a substantially vertical direction. A first side back side linkage is pivotably coupled to the back actuator at a first end and pivotably coupled to the first side lower slide at a second end. A second side front slide linkage is pivotably coupled to the back actuator at a first end and pivotably coupled to the second side lower slide at a second end.

In another aspect of the disclosure, the disclosure is directed to a method of denesting a container from a plurality of containers comprising the steps of (a) providing a frame assembly having a container cavity extending therethrough; (b) providing a pair of spaced apart upper slides, each having a flange extending into the container cavity; (c) providing a pair of spaced apart lower slides, each having a flange extending into the container cavity, with the flanges of the lower slides being spaced apart from the flanges of the upper slides, with the upper slides being positioned above the lower slides, so as to define a gap between respective flanges; (d) placing a stack of clamshell containers in a nested orientation above the frame assembly with a lowermost container of the stack of clamshell containers being retained by the flanges of the upper slides; (e) directing the upper slides in an outward direction so as to extend the flanges beyond a footprint of the clamshell container, to, in turn, allow the stack of clamshell containers to drop onto the flanges of the lower slides; (f) directing the upper slides in an inward direction so as to extend the flanges between the lowermost container of the stack of clamshell containers, and an immediately adjacent clamshell container; (g) directing the lower slides in an outward direction so as to extend the flanges beyond a footprint of the clamshell container, to, in turn, allow the lowermost container to drop out of the denester; and (h) directing the lower slides in an inward direction so as to extend the flanges into the cavity.

In a preferred embodiment, the method further comprises the step of repeating each of the steps of directing the upper and lower slides until each of the containers has passed through the container cavity.

In another preferred embodiment, an actuator is coupled to the upper slides so as to move them in unison in an inward and outward direction.

In yet another preferred embodiment, an actuator is coupled to the lower slides so as to move them in unison in an inward and outward direction.

BRIEF DESCRIPTION OF THE DRAWINGS

The disclosure will now be described with reference to the drawings wherein.

DETAILED DESCRIPTION OF THE DISCLOSURE

While this invention is susceptible of embodiment in many different forms, there is shown in the drawings and described herein in detail a specific embodiment with the understanding that the present disclosure is to be considered as an exemplification and is not intended to be limited to the embodiment illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Figure 1:
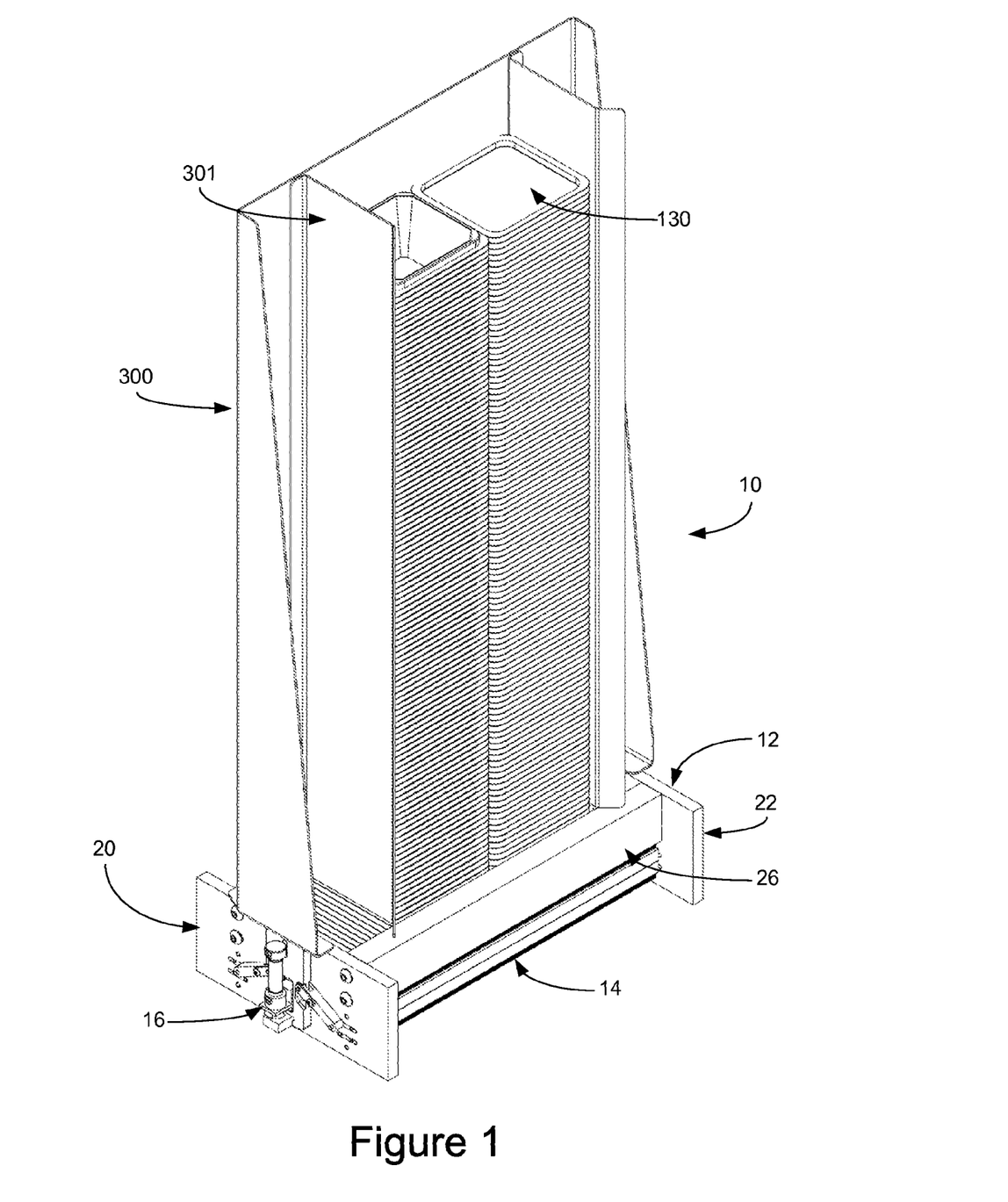
FIG. 1 of the drawings is a perspective view of the denester apparatus of the present disclosure.

Referring now to the drawings and in particular to FIG. 1, the container denester apparatus is shown generally at 10. The container denester apparatus (hereinafter referred to as the denester apparatus) is configured for supplying containers, such as clamshell container 130 sequentially to filling equipment. Among other things that are typically filled into such containers, include, but are not limited to berries, such as blueberries, raspberries, blackberries, strawberries, and the like. Of course, the same containers are utilized for other products, such as candies, nuts and the like. The invention is not limited to any particular filling equipment, or to any particular material which would be filled into the containers. Again, while clamshell containers are shown in the drawings, the disclosure is specifically not limited to clamshell containers, but can be utilized with other containers, such as paperboard tray containers, or the like (which are often covered with cellophane or other materials). As long as the container has the requisite structure to cooperate with the apparatus, it can be utilized in association with the present disclosure.

Figure 9:
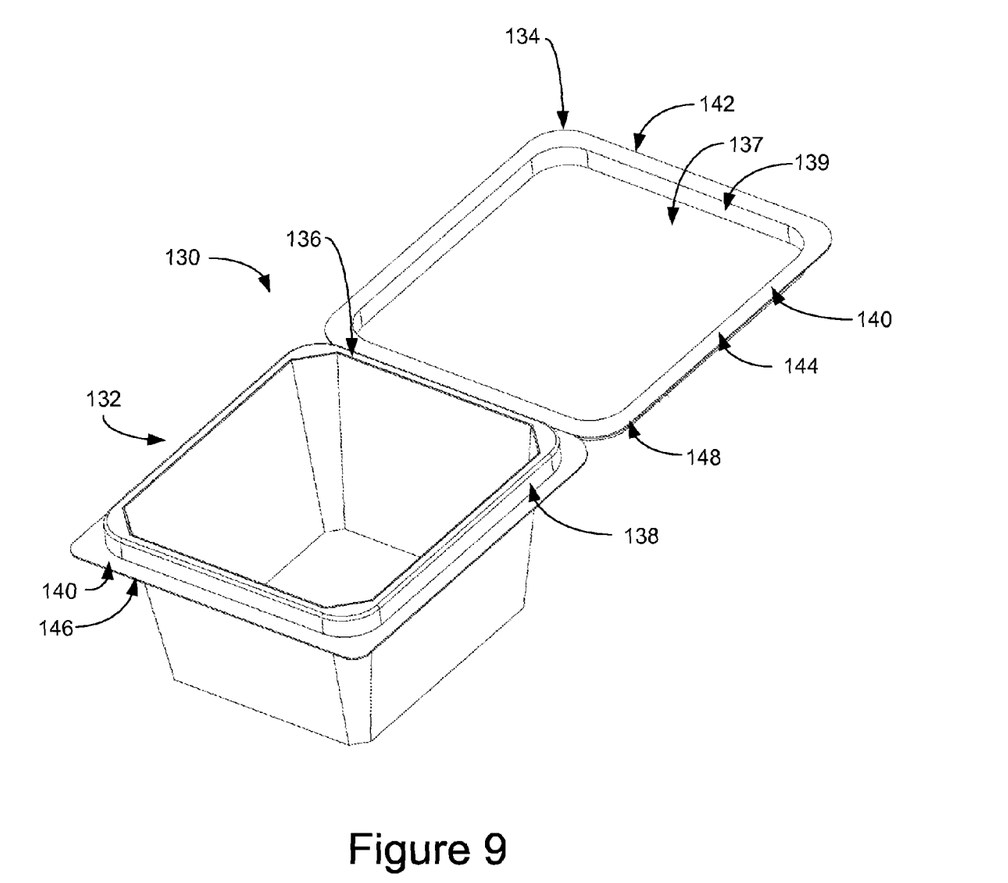
FIG. 9 of the drawings is a perspective view of an exemplary clamshell container for use in association with the container denester apparatus of the present disclosure.

A typical clamshell container 130 is shown in FIG. 9 as comprising first housing 132, second housing 134, hinge 136. Typically, the clamshell container 130 starts with the housings on either side of the hinge 136 wherein the housings are rotated about the hinge so that they overlie each other and provide a single cavity. An attachment structure 137 is typically provided that locks the first housing to the second housing. In the embodiment shown, the attachment structure comprises a raised ridge 138 on one of the housings and a recessed mating portion 139 which engage and are held through an interference fit or a snap fit.

A flange 140 extends about substantially the entirety of the outer perimeter of the clamshell container, and includes first housing flange portion 140 and second housing flange portion 142. The flanges actually form the basis from which the hinge 136 is formed. The flange 140 includes upper surface 144, lower surface 146. The upper and lower surfaces together define the outward edge 148. The denester apparatus cooperates with the flange 140 to supply the clamshell containers, sequentially, and in an indexed fashion to filling equipment (not shown). Other containers may have different cavities, or a single cavity, and may include different flange structures, provided that the flange structures can cooperate with the apparatus.

Figure 2:
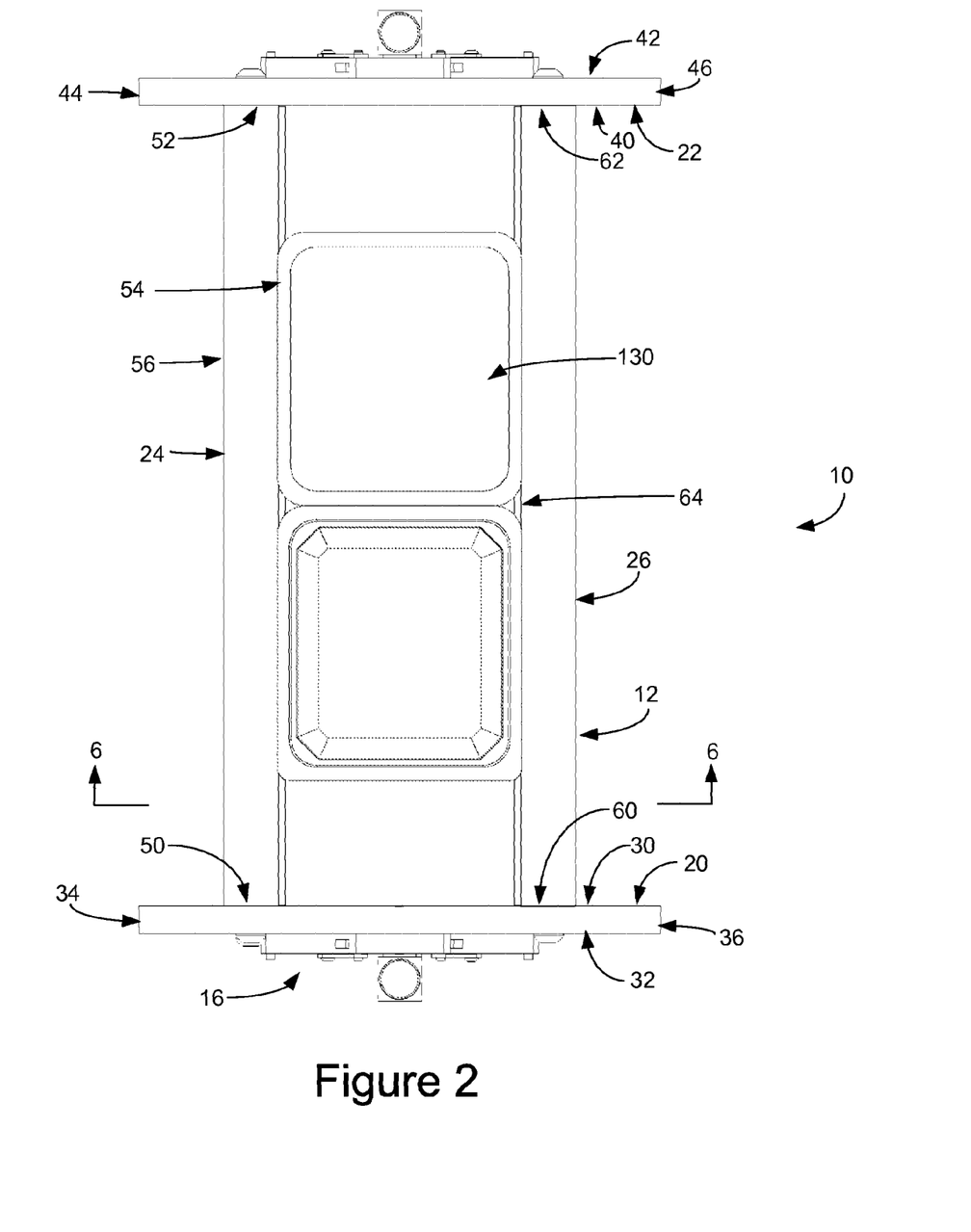
FIG. 2 of the drawings is a top plan view of the denester apparatus of the present disclosure.
Figure 3:
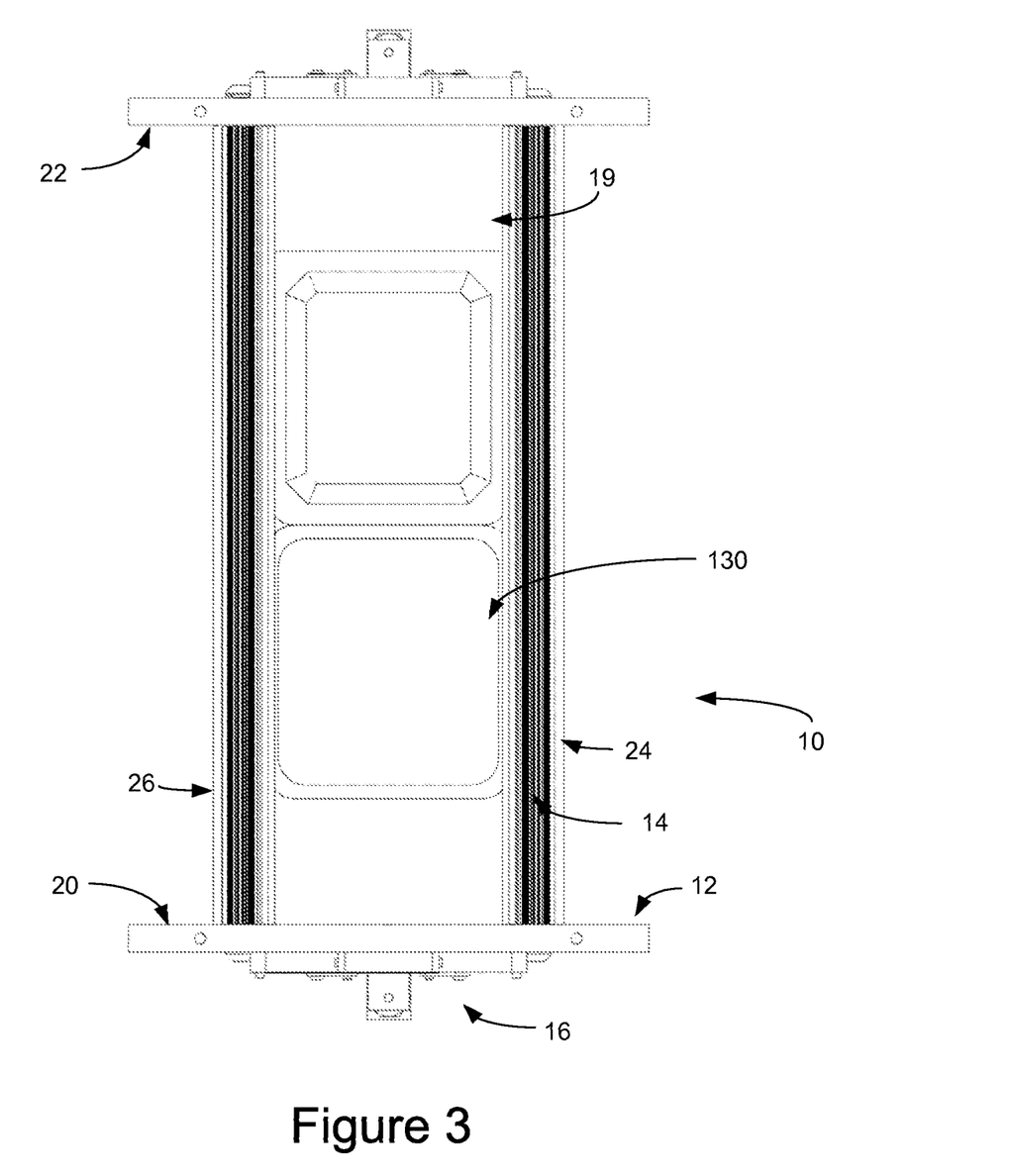
FIG. 3 of the drawings is a bottom plan view of the denester apparatus of the present disclosure.

The denester apparatus 10 is shown in greater detail in FIGS. 1 and 2 as comprising frame assembly 12, indexing assembly 14 and drive assembly 16. With specific reference to FIG. 1, the frame assembly 12 is shown as comprising front plate 20, back plate 22, first side guide 24 and second side guide 26. These elements are coupled together to form the frame structure. The frame assembly 12 can be coupled to filling equipment so that the individual containers that are supplied by the equipment can be sequentially delivered where needed on the filling equipment. Of course, the frame assembly can be coupled to other equipment as well.

With continued reference to FIG. 2, the front plate 20 includes inner surface 30, outer surface 32, first side 34, second side 36, first side upper rod opening 38a, first side lower rod opening 38b, second side upper rod opening 39a and second lower side rod opening 39b. The inner surface 30 is opposite the outer surface 32 and defines a thickness of the front plate. In the embodiment shown, the front plate is substantially planar and substantially rectangular in configuration. It is preferred that the front plate comprises a metal member, although a number of other suitable materials are likewise contemplated for use.

Figure 4:
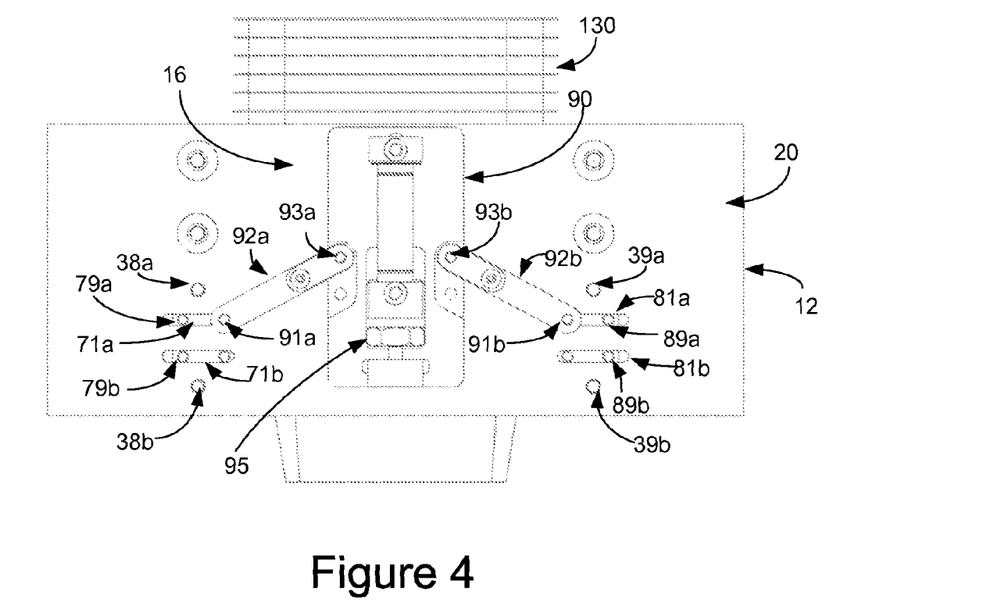
FIG. 4 of the drawings is a front elevational view of the denester apparatus of the present disclosure.

The first side rod openings 38a and 38b are shown in FIG. 4 and the second side rod openings 39a and 39b are also shown in FIG. 4 as being spaced apart from each other a predetermined distance. In the embodiment shown, the distance of the openings is such that when the indexing rods are inserted through the openings, they are in the proper orientation (with the upper and lower ones being substantially directly above/below each other, and with the alternating sides being directly across from each other). In the embodiment shown, the four openings position the four rods in a substantially parallel orientation so as to define a rectangle. In addition the four openings are substantially perpendicular to both the inner and outer surfaces 30, 32 (FIG. 2) so that the indexing rod will be substantially perpendicular to the inner surface 30 of the front plate 20.

Figure 5:
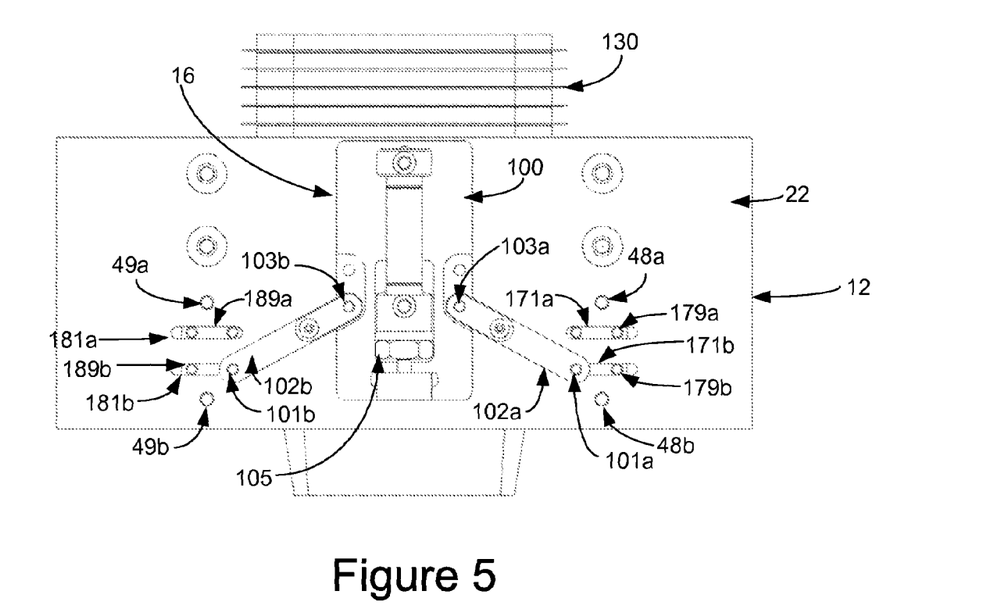
FIG. 5 of the drawings is a back elevational view of the denester apparatus of the present disclosure.

With reference to FIGS. 2 and 5, the back plate 22 is a substantially identical mirror image of the front plate 20. The back plate 22 includes inner surface 40, outer surface 42, first side 44, second side 46, first side upper rod opening 48a and the first side lower rod opening 48b and second side upper rod opening 49a and second side lower rod opening 49b. The inner surface 40 is opposite the outer surface 42 and defines a thickness of the back plate. As with the front plate, the back plate is substantially planar and substantially rectangular in configuration. It is preferred that the back plate comprises a metal member, although a number of other suitable materials are likewise contemplated for use.

With reference to FIGS. 2, 4, 5 and 6, the first side rod openings 48a, 48b and the second side rod openings 49a, 49b correspond to the first side rod openings 38a, 38b and the second side rod openings 39a, 39b so that the first side upper indexing rod 70a, the first side lower indexing rod 70b, the second side upper indexing rod 80a and the second side lower indexing rod 80b can span between the two so as to all be substantially perpendicular to the two plates.

With reference to FIG. 2, the first side guide 24 spans between the front plate 20 and the back plate 22. The first side guide includes front end 50 coupled to the front plate 20 through suitable fasteners, and back end 52 coupled to the back plate 22 through suitable fasteners. The first side guide 24 further includes inner surface 54 and lower surface 56. The inner surface 54 is substantially planar and extends substantially perpendicular to the inner surfaces 30, 40 of the first and second plates.

The second side guide 26 spans between the front plate 20 and the back plate 22 in a spaced apart orientation from the first side guide 24. The first side guide 24 and the second side guide 26 are substantial mirror images of each other taken about an axis that bisects the front and back plates. The second guide likewise includes front end 60 coupled to the front plate through suitable fasteners, and back end 62 coupled to the back plate 22 through suitable fasteners. The second side guide 26 further includes inner surface 64 and lower surface 66.

The inner surface 54 of the first side guide and the inner surface 64 of the second side guide are substantially parallel to each other and face each other in a spaced apart orientation. The front plate 20, back plate 22, first side guide 24 and second side guide 26 define the container cavity, with the first side guide and the second side guide defining the width of the container and the front and back plates defining the length thereof. To facilitate the movement of the containers, it is preferred that the inner surface 54, the inner surface 64 and the inner surfaces 30 and 40 are substantially planar and free of surface aberrations which can lead to undesired interference with the containers.

With reference to FIGS. 4 and 5, it will be understood that the positioning of the first and second upper and lower rod openings 38a, 38b, 48a, 48b, 39a, 39b and 49a, 49b are configured so that the resulting first and second upper and lower indexing rod is positioned in a desired orientation relative to the inner surfaces 54, 64 of the first and second side guides 24, 26.

The indexing assembly 14 includes first side upper indexing rod 70a, first side lower indexing rod 70b, second side upper indexing rod 80a, second side lower indexing rod 80b, first side upper slide 73a, first side lower slide 73b, second side upper slide 83a and second side lower slide 83b.

The upper indexing rod 70a extends between and rotates about an axis defined by first side upper rod opening 38a on front plate 20 and first side upper rod opening 48a on back plate 22. The first upper indexing rod 70a includes gear 72a which may extend substantially the entirety of the length of the indexing rod. In other embodiments, the gear 72a may comprise a plurality of separate and distinct gear portions that are disposed along the length of the indexing rod and spaced apart from each other. Typically, the gears will correspond to each other.

The lower indexing rod 70b extends between and rotates about an axis defined by first side lower rod opening 38b on front plate 20 and first side lower rod opening 48b on back plate 22. The first lower indexing rod 70b includes gear 72b which may extend substantially the entirety of the length of the indexing rod. In other embodiments, the gear 72b may comprise a plurality of separate and distinct gear portions that are disposed along the length of the indexing rod and spaced apart from each other. Typically, the gears will correspond to each other.

In the embodiment shown, the upper and the lower indexing rods are substantially vertically arranged relative to each other. Additionally, the gears 70a and 70b are substantially identical.

The upper indexing rod 80a extends between and rotates about an axis defined by first side upper rod opening 39a on front plate 20 and first side upper rod opening 49a on back plate 22. The second upper indexing rod 80a includes gear 82a which may extend substantially the entirety of the length of the indexing rod. In other embodiments, the gear 82a may comprise a plurality of separate and distinct gear portions that are disposed along the length of the indexing rod and spaced apart from each other. Typically, the gears will correspond to each other.

The lower indexing rod 80b extends between and rotates about an axis defined by first side lower rod opening 39b on front plate 20 and first side lower rod opening 48b on back plate 22. The first lower indexing rod 80b includes gear 82b which may extend substantially the entirety of the length of the indexing rod. In other embodiments, the gear 82b may comprise a plurality of separate and distinct gear portions that are disposed along the length of the indexing rod and spaced apart from each other. Typically, the gears will correspond to each other.

It will be understood that the upper indexing rods generally correspond to each other between the first and second sides. Similarly, the lower indexing rods generally correspond to each other between the first and second sides. That is, the side to side cooperation, as will be explained, provides coordinated movement to allow the dropping of clamshell containers.

The first side upper slide 73a extends below first side guide 24 between the front plate 20 and the back plate 22. The first side upper slide 73a includes upper surface 74a, lower surface 75a and inner surface 76a. The inner surface 76a generally corresponds to the inner surface 54 of the first side guide 24, such that the two are substantially flush (or so that the first side guide extends just inwardly beyond the inner surface 76a to preclude inadvertent jamming of a clamshell container therebetween). The upper surface 74a includes rack 77a which is configured to interface with the corresponding gear 72a of the first side upper indexing rod 70a. The inner surface 76a further includes inwardly extending flange 78a. The inwardly extending flange 78a is positioned between the upper and lower surfaces and spaced apart from each one of them. The flange 78a extends generally perpendicular to the direction of travel of the clamshell containers.

Figure 6:
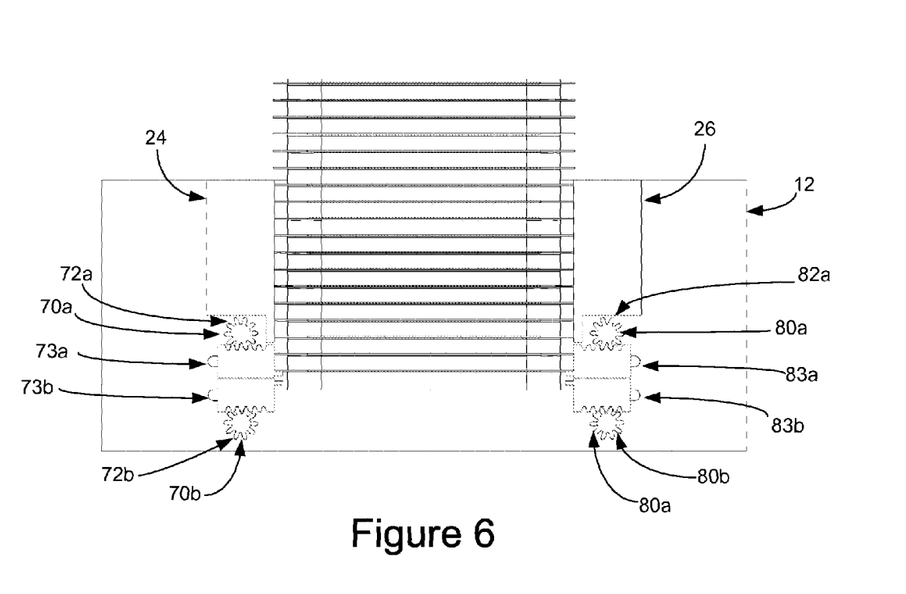
FIG. 6 of the drawings is a cross-sectional view of the denester apparatus of the present disclosure taken generally about lines 6-6 of FIG. 2.
Figure 7:
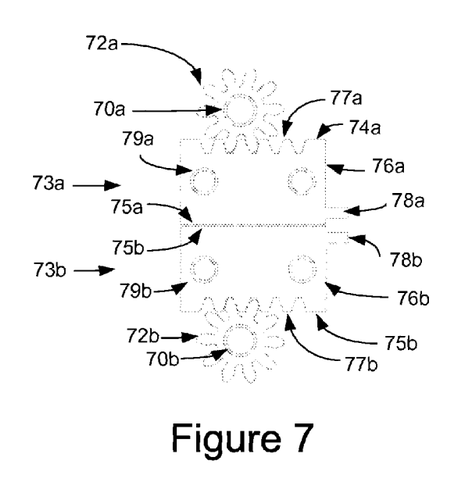
FIG. 7 of the drawings is a partial side elevational view of the denester apparatus of the present disclosure, showing in particular the first side slides and indexing rods.

With reference to FIGS. 5, 6 and 7, the first side upper slide 73a includes first side front pin set 79a and first side back pin set 179a. The first side front pin set 79a extends through first side front upper slot 71a and is slidably positionable along the slot. The first side back pin set 179a extends through the first side back upper slot 171a and is slidably positionable therealong. The cooperation of the slots and pins provides for the inward and outward movement of the first side upper slide, such slidable movement is controlled by the configuration of the respective upper slots 71a, 171a, as well as the position of the pin sets 79a, 179a positioned therein. It will be understood that in the present embodiment, a pair of pins comprise a pin set, whereas in other embodiments other structures are contemplated, such as elongated pins, or a single element, among others.

The rack 77a of the upper surface 74a of the first side upper slide 73a is configured to matingly engage gear 72a of the first side upper indexing rod 70a, when the slide is in the proper position within the device. As such, rotative movement of the first side upper indexing rod 70a results in translative movement of the first side upper slide 73a. And, the translative movement of the first side upper slide 73a thus limited to movement based on the configuration of the first side front upper slot 71a and first side back upper slot 171a. The size of the slots controls the range of displacement.

The first side lower slide 73b extends below the first side upper slide 73a between the front plate 20 and the back plate 22. The first side lower slide 73b includes upper surface 74b, lower surface 75b and inner surface 76b. The inner surface 76b generally corresponds to the inner surface 56 of the second side guide 26, such that the two are substantially flush (or so that the first side guide extends just inwardly beyond the inner surface 76*b* to preclude inadvertent jamming of a clamshell container therebetween). The lower surface 75*b* includes rack 77*b* which is configured to interface with the corresponding gear 72*b* of the first side lower indexing rod 70*b*. The inner surface 76*b* further includes inwardly extending flange 78*b*. The inwardly extending flange 78*b* is positioned between the upper and lower surfaces and is spaced apart from each one of them. The flange 78*b* extends generally perpendicular to the direction of travel of the clamshell containers. It will be understood that the flange 78*b* and the flange 78*a* are positioned in overlying orientation and are spaced apart from each other so that a gap is formed therebetween.

The first side lower slide 73*b* includes first side front pin set 79*b* and first side back pin set 179*b*. The first side front pin set 79*b* extends through first side front lower slot 71*b* and is slidably positionable along the slot. The first side back pin set 179*b* extends through the first side back lower slot 171*b* and is slidably positionable therealong. The cooperation of the slots and pins provides for the inward and outward movement of the first side lower slide, such slidable movement is controlled by the configuration of the respective upper slots 71*b*, 171*b*, as well as the position of the pin sets 79*b*, 179*b* positioned therein.

The rack 77*b* of the lower surface 75*b* of the first side lower slide 73*b* is configured to matingly engage gear 72*b* of the first side lower indexing rod 70*b*, when the slide is in the proper position within the device. As such, rotative movement of the first side lower indexing rod 70*b* results in translative movement of the first side lower slide 73*b*. And, the translative movement of the first side lower slide 73*b* thus limited to movement based on the configuration of the first side front lower slot 71*b* and first side back lower slot 171*b*. The size of the slots controls the range of displacement.

The first side upper and lower slides 73*a* and 73*b* are configured to slide relative to each other in a substantially parallel orientation (as the slots are generally in a spaced apart parallel orientation. The slidable movement is such that it is generally perpendicular to the travel of the clamshell containers. Of course, it is contemplated that the movement of the upper and lower slides may be oblique to each other.

Figure 8:
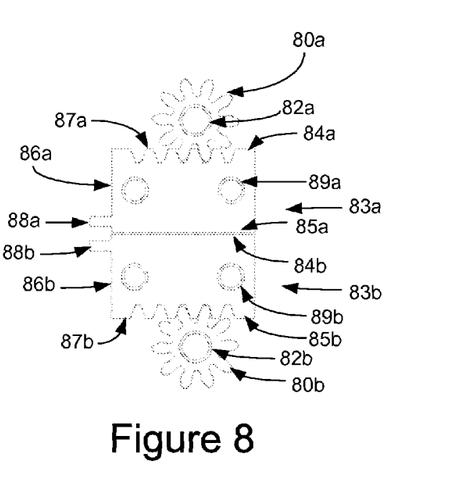
FIG. 8 of the drawings is a partial side elevational view of the denester apparatus of the present disclosure, showing in particular the second side slides and indexing rods.

With reference to FIGS. 6 and 8, the second side upper slide 83*a* extends below second side guide 26 between the front plate 20 and the back plate 22. The second side upper slide 83*a* includes upper surface 84*a*, lower surface 85*a* and inner surface 86*a*. The inner surface 86*a* generally corresponds to the inner surface 64 of the second side guide 26, such that the two are substantially flush (or so that the second side guide extends just inwardly beyond the inner surface 86*a* to preclude inadvertent jamming of a clamshell container therebetween). The upper surface 84*a* includes rack 87*a* which is configured to interface with the corresponding gear 82*a* of the second side upper indexing rod 80*a*. The inner surface 86*a* further includes inwardly extending flange 88*a*. The inwardly extending flange 88*a* is positioned between the upper and lower surfaces and spaced apart from each one of them. The flange 88*a* extends generally perpendicular to the direction of travel of the clamshell containers.

The second side upper slide 83*a* includes second side front pin set 89*a* and second side back pin set 189*a*. The second side front pin set 89*a* extends through second side front upper slot 81*a* and is slidably positionable along the slot. The second side back pin set 189*a* extends through the second side back upper slot 181*a* and is slidably positionable therealong. The cooperation of the slots and pins provides for the inward and outward movement of the second side upper slide, such slidable movement is controlled by the configuration of the respective upper slots 81*a*, 181*a*, as well as the position of the pin sets 89*a*, 189*a* positioned therein.

The rack 87*a* of the upper surface 84*a* of the second side upper slide 83*a* is configured to matingly engage gear 82*a* of the second side upper indexing rod 80*a*, when the slide is in the proper position within the device. As such, rotative movement of the second side upper indexing rod 80*a* results in translative movement of the second side upper slide 83*a*. And, the translative movement of the second side upper slide 83*a* thus limited to movement based on the configuration of the second side front upper slot 81*a* and second side back upper slot 181*a*. The size of the slots controls the range of displacement.

The second side lower slide 83*b* extends below the second side upper slide 83*a* between the front plate 20 and the back plate 22. The second side lower slide 83*b* includes upper surface 84*b*, lower surface 85*b* and inner surface 86*b*. The inner surface 86*b* generally corresponds to the inner surface 66 of the second side guide 26, such that the two are substantially flush (or so that the second side guide extends just inwardly beyond the inner surface 86*b* to preclude inadvertent jamming of a clamshell container therebetween). The lower surface 85*b* includes rack 87*b* which is configured to interface with the corresponding gear 82*b* of the second side lower indexing rod 80*b*. The inner surface 86*b* further includes inwardly extending flange 88*b*. The inwardly extending flange 88*b* is positioned between the upper and lower surfaces and is spaced apart from each one of them. The flange 88*b* extends generally perpendicular to the direction of travel of the clamshell containers. It will be understood that the flange 88*b* and the flange 88*a* are positioned in overlying orientation and are spaced apart from each other so that a gap is formed therebetween.

The second side lower slide 83*b* includes second side front pin set 89*b* and second side back pin set 189*b*. The second side front pin set 89*b* extends through second side front lower slot 81*b* and is slidably positionable along the slot. The second side back pin set 189*b* extends through the second side back lower slot 181*b* and is slidably positionable therealong. The cooperation of the slots and pins provides for the inward and outward movement of the second side lower slide, such slidable movement is controlled by the configuration of the respective upper slots 81*b*, 181*b*, as well as the position of the pin sets 89*b*, 189*b* positioned therein.

The rack 87*b* of the lower surface 85*b* of the second side lower slide 83*b* is configured to matingly engage gear 82*b* of the second side lower indexing rod 80*b*, when the slide is in the proper position within the device. As such, rotative movement of the second side lower indexing rod 80*b* results in translative movement of the second side lower slide 83*b*. And, the translative movement of the second side lower slide 83*b* thus limited to movement based on the configuration of the second side front lower slot 81*b* and second side back lower slot 181*b*. The size of the slots controls the range of displacement.

The second side upper and lower slides 83*a* and 83*b* are configured to slide relative to each other in a substantially parallel orientation (as the slots are generally in a spaced apart parallel orientation. The slidable movement is such that it is generally perpendicular to the travel of the clamshell containers. Of course, it is contemplated that the movement of the upper and lower slides may be oblique to each other.

The drive assembly is shown in FIGS. 4 and 5, with the portion of the drive assembly located proximate the front plate shown in FIG. 4, and the portion of the drive assembly located proximate the back plate shown in FIG. 5. The front portion of the drive assembly being configured to control the first side upper slide 73a and the second side upper slide 73b. In particular, the front portion of the drive assembly includes front actuator 90, front actuator guide 95, first side front slide linkage 92a and second side front slide linkage 92b. The slide linkages are configured so that upon translative upward and downward movement of the front actuator (as controlled by the front actuator guide 95), the slide linkages translate and rotate such that they impart slidable outward and inward movement upon the first side upper slide and the second side upper slide.

To achieve such movement, the first side front slide linkage 92a is coupled to the front actuator 90 at actuator pivot 93a. The first side front slide linkage 92a is coupled to the first side upper slide 73a at slide pivot 91a. Thus, downward movement of the front actuator 90 imparts, through the linkages, outward movement of each of the first side upper slide 73a and the second side upper slide 83a. Similarly, upward movement of the front actuator 90 imparts, through the linkages, inward movement of each of the first side upper slide 73a and the second side upper slide 83a. The gears 72a, 82a maintain smooth movement of the upper slides.

The back portion of the drive assembly is configured to control the first side lower slide 83a and the second side lower slide 83b. In particular, the back portion of the drive assembly includes front actuator 100, back actuator guide 105, first side back slide linkage 102a and second side back slide linkage 102b. The slide linkages are configured so that upon translative upward and downward movement of the back actuator (as controlled by the back actuator guide 105), the slide linkages translate and rotate such that they impart slidable outward and inward movement upon the first side lower slide and the second side lower slide.

To achieve such movement, the first side back slide linkage 102a is coupled to the back actuator 100 at actuator pivot 103a. The first side back slide linkage 102a is coupled to the first side lower slide 73b at slide pivot 101a. Thus, downward movement of the back actuator 100 imparts, through the linkages, outward movement of each of the first side lower slide 73b and the second side lower slide 83b. Similarly, upward movement of the back actuator 100 imparts, through the linkages, inward movement of each of the first side lower guide 73b and the second side lower slide 83b. The gears 72b, 82b maintain smooth movement of the upper slides.

In operation, the denester apparatus 10 is coupled to another device which utilizes containers, such as filling equipment. The apparatus 10 is positioned in an orientation wherein it is capable of sequentially supplying containers to the equipment located further downstream. As is shown in FIG. 1, a retaining wall structure 300 can be positioned above the denester to preclude the column of empty nested clamshell containers from tipping over. The inner walls 301 of the retaining wall structure 300 may be positionable in a plurality of different orientations to accommodate clamshell containers of different configurations.

To initially load the clamshell containers, the orientation of the upper and lower slides is known at the outset. If all of the slides are pushed outwardly, then there is nothing to retain the clamshell containers. Thus, at least one of the opposing slides needs to be in an inward position to be in a position to retain the clamshell containers. To initiate the placement of the clamshell containers, it is first necessary to extend the first side lower slide 73b and the second side lower slide 83b into an inward orientation. Additionally, the upper slides 73a, 83a are also in the inward orientation. In such an orientation, the flange 78b, 88b extends inwardly beyond the footprint of the side guides 24, 26 and into the cavity 19. Similarly, flange 78a, 88a are likewise extended inwardly beyond the footprint of the side guides 24, 26 and into cavity 19. Such an orientation is shown in FIG. 1.

Once the lower slides are in position, the stack of clamshell containers can be inserted as is shown in FIG. 1. In such a configuration, the lower surface 146 of the flange portions 140, 142 of the lowermost clamshell container 130 abuts the flanges 78a, 88a of the upper slides 73a, 83a. The lowermost clamshell container is thus precluded from passage through the cavity. The remaining clamshell containers are then stacked and nested in one another until a desired stack is built.

Once the desired clamshell containers have been stacked up, and it is desired that they are released sequentially, the denester can be actuated. Specifically, the front actuator 90 is directed in a downward direction. This movement directs the first side front slide linkage 92a and the second side front slide linkage 92b to rotate and translate about the actuator pivot and the slide pivot. The movement of the linkages imparts movement to the pin sets 79a and 79b, which, in turn, move the upper slides 73a, 83a in outward direction. As they reach an outward point that is beyond the footprint of the first and second flange portions, the lowermost clamshell container falls (along with the clamshell containers that are positioned over the lowermost clamshell container). The movement of the slides is limited by the travel of the actuator and the orientation and length of the upper slots. It will also be understood that the gears 72a, 82a facilitate the controlled movement of the slide in a direction that is generally perpendicular to the movement of the clamshell containers through the denester.

While the upper slides have moved in an outward direction, the further downward movement of the clamshell containers is precluded by the flanges 78b, 88b of the lower slides 73b, 83b. The lower slides remain in the inward direction.

Thus, the clamshell containers again are precluded from further downward movement. At this point, the upper slides 73a, 83a are directed inwardly, through movement of the front actuator 90 in an upward direction, and, through the rotation and translation of the slide linkages 91a, 91b. Due to the gap 67, 167 between the flange 78a and flange 78b, and between flange 88a and flange 88b, the first and second flange portions of the lowermost clamshell container are trapped within the gap. The second clamshell container (the clamshell container that is immediately above the lowermost clamshell container) is disposed above (and often in an abutting configuration) the upper slides 73a, 83a.

Thus, when the lower slides 73b, 83b are moved outwardly, eventually, they move outwardly beyond the footprint of the lowermost clamshell container. To achieve the same, the back actuator 100 is moved in a downward direction. This imparts both translation and rotation of the first side back slide linkage 102a and the second side back slide linkage 102b. In turn, the pins of the slide are directed to move the lower slides 73b, 83b in an outward direction. As such, there is nothing retaining the lowermost clamshell container, and that container falls out of the denester and can be picked up by further processing equipment.

The clamshell container that was immediately above the lowermost clamshell container has now become the lowermost clamshell container. This container is resting on the flanges 78a, 88a of the upper slides 73a, 83a. The remaining containers are positioned above this container, and nested within each other.

Finally, to complete the cycle, the lower slides 73b, 83b are returned inwardly. This is achieved by returning the back actuator 100 in an upward direction. This action rotates and translates the back slide linkages 101b, 102b. In turn, the back slide linkages move the lower slides 73b, 83b in an inward direction. The gears 72b, 82b maintain the smooth operation of the slides and control the movement of the slides, to insure that they are properly tracked. Thus, the denester is in the same position as the initial position, only a single clamshell container (the lowermost clamshell container) has been released, and the immediately adjacent clamshell container became the lowermost clamshell container.

They cycle then repeats, with the upper slides moving outwardly, then back inwardly, then the lower slides moving outwardly then inwardly. The repetition can occur until all of the clamshell containers are passed through the denester.

The foregoing description merely explains and illustrates the invention and the invention is not limited thereto except insofar as the appended claims are so limited, as those skilled in the art who have the disclosure before them will be able to make modifications without departing from the scope of the invention.

What is claimed is:

1. A container denester apparatus configured to denest a lowermost container from a stack of containers, each of the containers including a flange extending about at least a portion of either side of the container, the apparatus comprising:
    a frame assembly having a front plate and a back plate defining a container cavity therebetween;
    an indexing assembly comprising
        a first side upper slide and a second side upper slide, the first side upper slide being spaced apart from the second side upper slide and each spanning between the front plate and the back plate of the frame assembly, each of the first side and second side upper slides having an inner surface with an inwardly projecting flange, the first side and second side upper slides being slidably movable between a first inward position and a second outward position, wherein in the first inward position, the inwardly projecting flange of each of the first side and second side upper slides extend into the cavity;
        a first side lower slide and a second side lower slide, the first side lower slide being spaced apart from the second side lower slide and each spanning between the front plate and the back plate of the frame assembly, and corresponding to and positioned below the first side and the second side upper slides, each of the first side and second side lower slides having an inner surface with an inwardly projecting flange, the first side and second side lower slides being slidably movable between a first inward position and a second outward position, wherein in the first inward position, the inwardly projecting flange of each of the first side and second side upper slides extend into the cavity;
        the flange of the first side upper slide being spaced apart, vertically, from the flange of the first side lower slide, and the flange of the second side upper slide being spaced apart, vertically from the flange of the second side lower slide; and
    a drive assembly comprising an actuator coupled to the first side and second side upper slides, the actuator configured to direct cooperative slidable movement of the upper slides between the first inward position and the second outward position, and coupled to the first side and the second side lower slides, the actuator configured to direct cooperative slidable movement of the lower slides between the first inward position and the second outward position,
    wherein the drive assembly comprises a front actuator coupled to the upper slides and a back actuator coupled to the lower slides, and
    wherein the front actuator is configured to move in a substantially vertical direction, a first side front side linkage is pivotably coupled to the front actuator at a first end and pivotably coupled to the first side upper slide at a second end, a second side front slide linkage is pivotably coupled to the front actuator at a first end and pivotably coupled to the second side upper slide at a second end.

2. The container denester apparatus of claim 1 wherein the frame assembly includes a first side guide spanning between the front plate and the back plate and a second side guide spanning between the front plate and the back plate, the first side guide being positioned above and over at least a portion of the first side upper slide and the first side lower slide and defining the side of the cavity, with the flange of the first side upper slide and the first side lower slide extending into the cavity, the second side guide being positioned above and over at least a portion of the second side upper slide and the second side lower slide and defining the side of the cavity, with the flange of the second side upper slide and the second side lower slide extending into the cavity.

3. The container denester apparatus of claim 2 wherein the first side guide includes an inner surface which is substantially coplanar with the inner surface of each of the first side upper slide and the first side lower slide.

4. The container denester apparatus of claim 3 wherein the second side guide includes an inner surface which is substantially coplanar with the inner surface of each of the second side upper slide and the second side lower slide.

5. The container denester apparatus of claim 1 wherein the upper slides and the lower slides are configured to move between the first inward position and the second outward position through slidable movement wherein each of the slides includes a pin at either end thereof, the pin at a first end corresponds with a slot in the front plate and the pin at a second end corresponds with a slot in the back plate.

6. The container denester apparatus of claim 5 wherein the movement between the first inward position and the second outward position is substantially uniformly linear and substantially perpendicular to the direction of travel of clamshell containers through the denester.

7. The container denester apparatus of claim 1 wherein the indexing assembly further includes a first side upper indexing rod extending above the first side upper slide, with the first side upper slide further including a gear rack disposed thereon, the first side upper indexing rod having a gear positioned thereon, such that slidable movement of the first side upper slide between the first inward position and the second outward position imparts rotation to the first side upper indexing rod through interference between the gear and the gear rack.

8. The container denester apparatus of claim 7 wherein the indexing assembly further includes a second side upper indexing rod extending above the second side upper slide, with the second side upper slide further including a gear rack disposed thereon, the second side upper indexing rod having a gear positioned thereon, such that slidable movement of the second side upper slide between the first inward position and the second outward position imparts rotation to the second side upper indexing rod through interference between the gear and the gear rack.

9. The container denester apparatus of claim 8 wherein the indexing assembly further includes a first side lower indexing rod extending below the first side lower slide, with the first side lower slide further including a gear rack disposed thereon, the first side lower indexing rod having a gear positioned thereon, such that slidable movement of the first side lower slide between the first inward position and the second outward position imparts rotation to the first side lower indexing rod through interference between the gear and the gear rack.

10. The container denester apparatus of claim 9 wherein the indexing assembly further includes a second side lower indexing rod extending below the second side lower slide, with the second side lower slide further including a gear rack disposed thereon, the second side lower indexing rod having a gear positioned thereon, such that slidable movement of the second side lower slide between the first inward position and the second outward position imparts rotation to the second side lower indexing rod through interference between the gear and the gear rack.

11. The container denester apparatus of claim 1 wherein the front actuator is positioned proximate the front plate and the back actuator is positioned proximate the back plate.

12. The container denester apparatus of claim 1 wherein the back actuator is configured to move in a substantially vertical direction, a first side back side linkage is pivotably coupled to the back actuator at a first end and pivotably coupled to the first side lower slide at a second end, a second side front slide linkage is pivotably coupled to the back actuator at a first end and pivotably coupled to the second side lower slide at a second end.

13. A container denester apparatus configured to denest a lowermost container from a stack of containers, each of the containers including a flange extending about at least a portion of either side of the container, the apparatus comprising:
a frame assembly having a front plate and a back plate defining a container cavity therebetween;
an indexing assembly comprising
a first side upper slide and a second side upper slide, the first side upper slide being spaced apart from the second side upper slide and each spanning between the front plate and the back plate of the frame assembly, each of the first side and second side upper slides having an inner surface with an inwardly projecting flange, the first side and second side upper slides being slidably movable between a first inward position and a second outward position, wherein in the first inward position, the inwardly projecting flange of each of the first side and second side upper slides extend into the cavity;
a first side lower slide and a second side lower slide, the first side lower slide being spaced apart from the second side lower slide and each spanning between the front plate and the back plate of the frame assembly, and corresponding to and positioned below the first side and the second side upper slides, each of the first side and second side lower slides having an inner surface with an inwardly projecting flange, the first side and second side lower slides being slidably movable between a first inward position and a second outward position, wherein in the first inward position, the inwardly projecting flange of each of the first side and second side upper slides extend into the cavity;
the flange of the first side upper slide being spaced apart, vertically, from the flange of the first side lower slide, and the flange of the second side upper slide being spaced apart, vertically from the flange of the second side lower slide; and
a drive assembly comprising an actuator coupled to the first side and second side upper slides, the actuator configured to direct cooperative slidable movement of the upper slides between the first inward position and the second outward position, and coupled to the first side and the second side lower slides, the actuator configured to direct cooperative slidable movement of the lower slides between the first inward position and the second outward position,
wherein the drive assembly comprises a front actuator coupled to the upper slides and a back actuator coupled to the lower slides, and
wherein the back actuator is configured to move in a substantially vertical direction, a first side back side linkage is pivotably coupled to the back actuator at a first end and pivotably coupled to the first side lower slide at a second end, a second side front slide linkage is pivotably coupled to the back actuator at a first end and pivotably coupled to the second side lower slide at a second end.

14. The container denester apparatus of claim 13 wherein the frame assembly includes a first side guide spanning between the front plate and the back plate and a second side guide spanning between the front plate and the back plate, the first side guide being positioned above and over at least a portion of the first side upper slide and the first side lower slide and defining the side of the cavity, with the flange of the first side upper slide and the first side lower slide extending into the cavity, the second side guide being positioned above and over at least a portion of the second side upper slide and the second side lower slide and defining the side of the cavity, with the flange of the second side upper slide and the second side lower slide extending into the cavity.

15. The container denester apparatus of claim 14 wherein the first side guide includes an inner surface which is substantially coplanar with the inner surface of each of the first side upper slide and the first side lower slide.

16. The container denester apparatus of claim 15 wherein the second side guide includes an inner surface which is substantially coplanar with the inner surface of each of the second side upper slide and the second side lower slide.

17. The container denester apparatus of claim 13 wherein the indexing assembly further includes a first side upper indexing rod extending above the first side upper slide, with the first side upper slide further including a gear rack disposed thereon, the first side upper indexing rod having a gear positioned thereon, such that slidable movement of the first side upper slide between the first inward position and the second outward position imparts rotation to the first side upper indexing rod through interference between the gear and the gear rack.

18. The container denester apparatus of claim 17 wherein the indexing assembly further includes a second side upper indexing rod extending above the second side upper slide, with the second side upper slide further including a gear rack disposed thereon, the second side upper indexing rod having a gear positioned thereon, such that slidable movement of the second side upper slide between the first inward position and the second outward position imparts rotation to the second side upper indexing rod through interference between the gear and the gear rack.

19. The container denester apparatus of claim 18 wherein the indexing assembly further includes a first side lower indexing rod extending below the first side lower slide, with the first side lower slide further including a gear rack disposed thereon, the first side lower indexing rod having a gear positioned thereon, such that slidable movement of the first side lower slide between the first inward position and the second outward position imparts rotation to the first side lower indexing rod through interference between the gear and the gear rack.

20. The container denester apparatus of claim 19 wherein the indexing assembly further includes a second side lower indexing rod extending below the second side lower slide, with the second side lower slide further including a gear rack disposed thereon, the second side lower indexing rod having a gear positioned thereon, such that slidable movement of the second side lower slide between the first inward position and the second outward position imparts rotation to the second side lower indexing rod through interference between the gear and the gear rack.

* * * * *